United States Patent
Subbanna

(10) Patent No.: US 8,635,361 B2
(45) Date of Patent: Jan. 21, 2014

(54) TRANSACTION ACCELERATION USING APPLICATION-SPECIFIC LOCKING

(75) Inventor: Kartik Subbanna, Fremont, CA (US)

(73) Assignee: Riverbed Technology, Inc., San Francisco, CA (US)

(*) Notice: Subject to any disclaimer, the term of this patent is extended or adjusted under 35 U.S.C. 154(b) by 825 days.

(21) Appl. No.: 12/327,766

(22) Filed: Dec. 3, 2008

(65) Prior Publication Data

US 2009/0144440 A1 Jun. 4, 2009

Related U.S. Application Data

(60) Provisional application No. 60/992,074, filed on Dec. 3, 2007.

(51) Int. Cl.
*G06F 15/16* (2006.01)

(52) U.S. Cl.
USPC ........... 709/233; 709/203; 709/225; 709/230; 709/231; 709/232; 709/219

(58) Field of Classification Search
USPC .......... 709/203, 219, 225, 233, 230, 231, 232
See application file for complete search history.

(56) References Cited

U.S. PATENT DOCUMENTS

| | | | |
|---|---|---|---|
| 5,754,774 A | 5/1998 | Bittinger et al. | |
| 6,178,461 B1 | 1/2001 | Chan et al. | |
| 6,415,329 B1 | 7/2002 | Gelman et al. | |
| 6,874,017 B1 | 3/2005 | Inoue et al. | |
| 7,581,005 B2 * | 8/2009 | Montemayor et al. | 709/225 |
| 2004/0215746 A1 * | 10/2004 | McCanne et al. | 709/219 |
| 2005/0144276 A1 * | 6/2005 | Bird et al. | 709/225 |
| 2005/0283536 A1 * | 12/2005 | Swanson et al. | 709/232 |
| 2007/0110057 A1 * | 5/2007 | Hwang et al. | 370/389 |
| 2007/0143491 A1 * | 6/2007 | Velrajan et al. | 709/231 |
| 2008/0229021 A1 * | 9/2008 | Plamondon | 711/125 |
| 2008/0229023 A1 * | 9/2008 | Plamondon | 711/126 |
| 2008/0229025 A1 * | 9/2008 | Plamondon | 711/126 |
| 2008/0235326 A1 * | 9/2008 | Parsi et al. | 709/203 |

(Continued)

OTHER PUBLICATIONS

Amer, Ahmed et al., "File Access Prediction with Adjustable Accuracy," 2002, *Proceedings of the Performance, Computing and Communications Conference 2002, on 21st IEEE International*, pp. 131-140.

(Continued)

*Primary Examiner* — Brian P Whipple
*Assistant Examiner* — Jonathan Bui
(74) *Attorney, Agent, or Firm* — Park, Vaughan, Fleming & Dowler LLP

(57) ABSTRACT

A data access request from an application for access to a data resource is received from a first application. The data access request is analyzed to identify application-specific behavior indicating a type of data access for the data resource. The WAN acceleration functionality of a first device is configured for network traffic optimization based on the type of data access for the data resource. The analysis of the data access request may be based on attributes of the data access request, the data resource, and/or an access control restriction. The network traffic optimization may be adapted to optimize network traffic to a first portion of the data resource that is different than a second portion of the data resource associated with the data access request or to a second data resource separate from the data resource associated with the data access request.

21 Claims, 3 Drawing Sheets

(56) References Cited

U.S. PATENT DOCUMENTS

| | | | |
|---|---|---|---|
| 2009/0006402 A1* | 1/2009 | Bohle et al. | 707/8 |
| 2009/0052452 A1* | 2/2009 | Patel et al. | 370/392 |
| 2009/0052466 A1* | 2/2009 | Khalid et al. | 370/467 |
| 2009/0067440 A1* | 3/2009 | Chadda et al. | 370/401 |
| 2009/0112921 A1* | 4/2009 | Oliveira et al. | 707/103 R |
| 2009/0271876 A1* | 10/2009 | Takagi | 726/30 |

OTHER PUBLICATIONS

Caceres, Ramon et al., "Web Proxy Caching: The Devil is in the Details," Jun. 1998, *Proceedings of the Workshop on Internet Server Performance*, Madison, Wisconsin, pp. 111-118.

Deshpande, Mukund et al., "Selective Markov Models for Predicting Web-Page Accesses," 2004, *ACM Transactions on Internet Technology*, vol. 4, Issue 2, pp. 163-184.

Fan, Li et al., "Summary Cache: A Scalable Wide-Area Web Cache Sharing Protocol," Jun. 2000, *Proceedings of the IEEE/ACM Transactions on Networking*, vol. 8, No. 3, pp. 281-293.

Feldmeier, D.C. et al., "Protocol Boosters," Apr. 1998, IEEE JSAC, vol. 16, Issue No. 3, pp. 437-444.

Griffioen, James et al., "Automatic Prefetching in a WAN," Oct. 1993, *Proceedings of the IEEE Workshop on Advances in Parallel and Distributed Systems*, Technical Report # CS243-93, pp. 8-12.

Griffioen, James et al., "Reducing File System Latency using a Predictive Approach," Jun. 1994, *Proceedings of the USENIX Summer 1994 Technical Conference on USENIX*, Technical Conference, vol. 1.

Lei, Hui et al., "An Analytical Approach to File Prefetching," Jan. 1997, *Proceedings of the Annual Conference on USENIX Annual Technical Conference*, Anaheim, California, pp. 1-12.

Oly, James et al., "Markov Model Prediction of I/O Requests for Scientific Applications," Jun. 2002, *Proceedings of the 16th International Conference on Supercomputing*, pp. 147-155.

Padmanabhan et al., "Using Predictive Prefetching to improve World Wide Web latency," Jul. 1996, *ACM SIGCOMM Computer Communication Review*, vol. 26, No. 3, pp. 22-36.

Rhea, Sean C. et al., "Value-Based Web Caching," May 2003, *Proceedings of the 12th International Conference on World Wide Web*, Budapest, Hungary, pp. 619-628.

Tolia, Niraj, et al., "An Architecture for Internet Data Transfer," May 2006, *Third Symposium on Networked Systems Design and Implementation (NSDI'06)*, San Jose, California.

Yang, Qiang et al., "Mining Web Logs for Prediction Models in WWW Caching and Prefetching," Aug. 2001, *Proceedings of the Seventh ACM SIGKDD International Conference on Knowledge Discovery and Data Mining KDD'01*, San Francisco, California, pp. 473-478.

Amer, Ahmed et al., "File Access Prediciton with Adjustable Accuracy", "Proceedings of the Performance, Computing, and Communications Conference 2000, on 21st IEEE International", 2002, pp. 131-140.

Caceres, Ramon et al., "Web Proxy Caching: The Devil is in the Details", "Proceedings of the Workshop on Internet Server Performance", Jun. 1998, pp. 111-118, Published in: Madison, Wisconsin.

Deshpande, Mukund et al., "Selective Markov Models for Predicting Web-Page Accesses", "ACM Transactions on Internet Technology", 2004, pp. 163-184, vol. 4, No. 2.

Fan, Li et al., "Summary Cache: A Scalable Wide-Area Web Cache Sharing Protocol", "Proceedings of the IEEE/ACM Transcations on Networking", Jun. 2000, pp. 281-293, vol. 8, No. 3.

Feldmeier, D.C. et al., "Protocol Boosters", "IEEE JSAC", Apr. 1998, pp. 437-444, vol. 16, No. 3.

Griffioen, James et al., "Automatic Prefetching in a WAN", "Proceedings of the IEEE Workshop on Advances in Parallel and Distributed Systems", Oct. 1993, pp. 8-12, vol. CS243, No. 93, Publisher: Technical Report.

Griffioen, James et al., "Reducing File System Latency Using a Predictive Approach", "Proceedings of the USENIX Summer 1994 Technical Conference on USENIX", Jun. 1994, vol. 1, Publisher: Technical Conference.

Lei, Hui et al., "An Analytic Approach to File Pre-Fetching", "Proceedings of the Annual Conference on USENIX Annual Technical Conference", Jan. 1997, pp. 1-12, Published in: Anaheim, California.

Oly, James et al., "Markov Model Prediction of I/O Requests for Scientific Applications", "Proceedings of the 16th International Conference on Supercomputing", Jun. 2002, pp. 147-155.

Padmanabhan et al., "Using Predictive Prefetching to Improve World Wide Web Latency", "ACM SIGCOMM Computer Communication Review", Jul. 1996, pp. 22-36, vol. 26, No. 3.

Rhea, Sean C. et al., "Value-Based Web Caching", "Proceedings of the 12th International Conference on World Wide Web", May 2003, pp. 619-628, Published in: Budapest, Hungary.

Tolia, Niraj et al., "An Architecture for Internet Data Transfer", "Third Symposium on Networked Systems Design and Implementation (NSDI'06)", May 2006, Published in: San Jose, California.

Yang, Qiang et al., "Mining Web Logs for Prediction Models in WWW Caching and Prefetching", "Proceedings of the Seventh ACM SIGKDD International Conference on Knowledge Discovery and Data Mining KDD'01", Aug. 2001, pp. 473-478, Published in: San Francisco, California.

\* cited by examiner

200

250

TRANSACTION ACCELERATION USING APPLICATION-SPECIFIC LOCKING

CROSS REFERENCE TO RELATED APPLICATIONS

This application claims priority to U.S. Provisional Patent Application No. 60/992,074, filed Dec. 3, 2007, and entitled "Transaction Acceleration Using Application-Specific Locking," which is incorporated by reference herein for all purposes.

BACKGROUND

The present invention relates network optimization in general and in particular to accelerating network transactions including data from files and resources that can be locked to control inconsistent access. The present invention also relates to acceleration of protocols used to access shared data objects.

Applications often use locks or other types of access control restrictions to prevent, reduce, or eliminate inconsistent accesses to data in files and other resources. An inconsistent access, for example, might occur if one application attempts to change data in a file while another application attempts to read from the file at the same time. Locks and other types of access control restrictions can prevent applications from writing and/or reading from files while another application is modifying the file. Locks and other types of access control restrictions are often implemented within file access protocols, such as CIFS and NFS.

Additionally, some applications may use protocol-independent mechanisms to prevent, reduce, or eliminate inconsistent accesses to data in files and other resources. For example, one application may set a signal or flag to indicate to other applications that the file is in use. Signals and flags can be implemented by locking a predetermined offset in a file, creating or modifying a separate file or other resource, or using any other inter-application communication technique.

WAN accelerators optimize network traffic to improve network performance in reading and/or writing data over a network. WAN accelerators are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers. Additionally, techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. Herein, the term "WAN accelerator" is used to refer to such devices and "WAN acceleration" is used to refer to such techniques.

Previously, WAN accelerators must respect the locks and other access control restrictions set by applications and protocols to prevent errors or data corruption. Often, WAN accelerators operate more conservatively due to locks and access control restrictions, for example by reducing or disabling WAN acceleration for applications and files associated with locks. This reduces application performance when accessing files via a network.

BRIEF SUMMARY

An embodiment of the invention includes a method of accelerating data access over a wide-area network. A data access request from an application for access to a data resource is received from a first application. The data access request is analyzed to identify application-specific behavior indicating a type of data access for the data resource. The WAN acceleration functionality of a first device is configured for network traffic optimization based on the type of data access for the data resource.

In an embodiment, the analysis of the data access request may be based on attributes of the data access request, attributes of the data resource, and/or attributes of an access control restriction associated with the data resource. The access control restriction associated with the data resource may be initiated in response to the current or a previous data access request.

In an embodiment, the network traffic optimization is adapted to prefetch and buffer a first portion of the data resource that is different than a second portion of the data resource associated with the data access request. For example, the second portion of the data resource may be associated with an access control restriction and the first portion of the data resource is not associated with the access control restriction. In another embodiment, the network traffic optimization is adapted to prefetch and buffer a second data resource separate from the data resource associated with the data access request.

After receiving a second data access request, a further embodiment determines if the second data access request is consistent with the application-specific behavior. This embodiment may modify the second data access request in response to the determination that the second data access request is inconsistent with the application-specific behavior, or further, configure the WAN acceleration functionality of the first device to the default network traffic optimization.

BRIEF DESCRIPTION OF THE DRAWINGS

The invention will be described with reference to the drawings, in which.

In the drawings, the use of identical reference numbers indicates identical elements.

DETAILED DESCRIPTION OF ILLUSTRATIVE EMBODIMENTS

Figure 1:
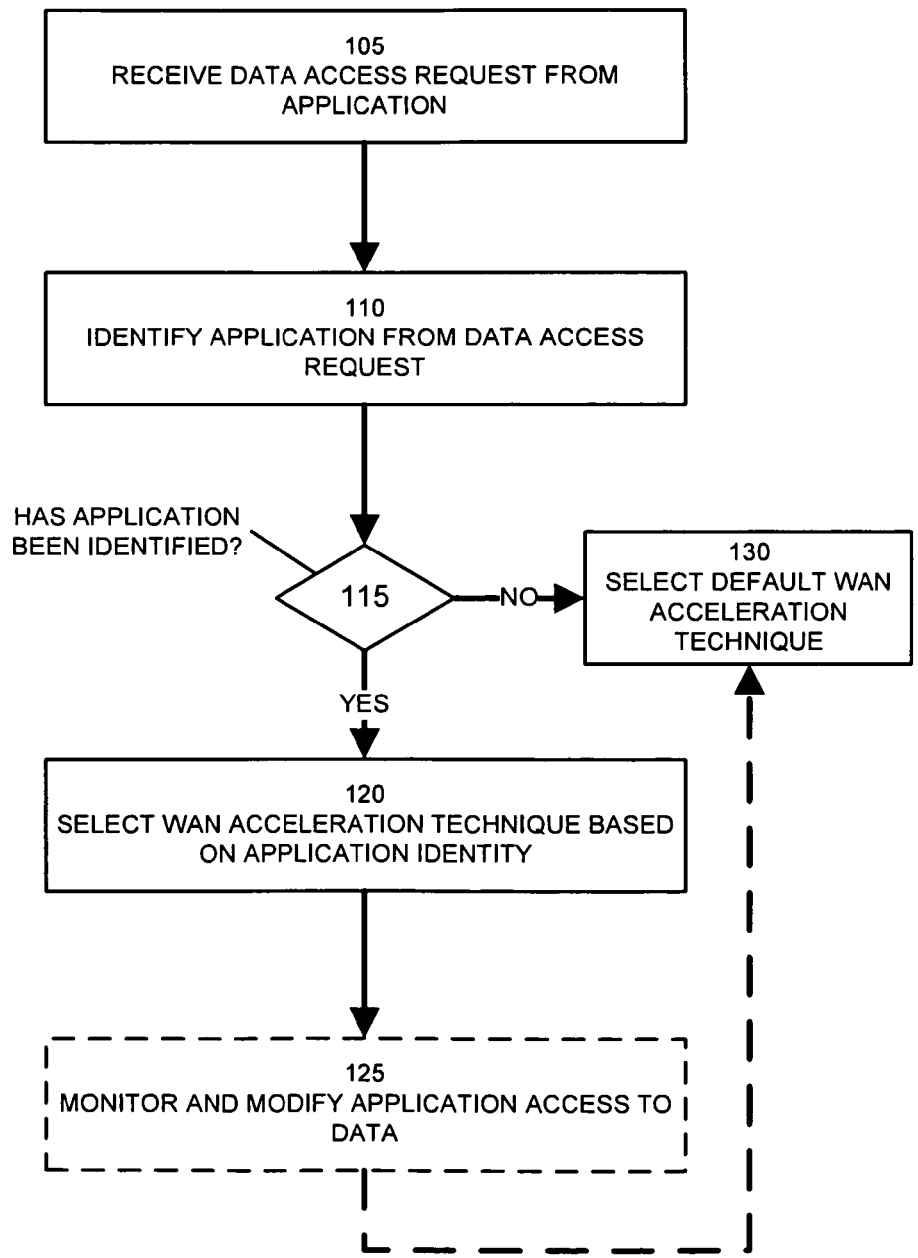
FIG. 1 illustrates a method of optimizing network traffic based on application-specific behavior according to an embodiment of the invention.

FIG. 1 illustrates a method 100 of optimizing network traffic based on application-specific behavior according to an embodiment of the invention. Step 105 intercepts a request to access a file or other resource. In an embodiment, an application creates an access request and sends it to a file server or other data storage system via a network file protocol, such as CIFS or NFS. An embodiment of the invention performs step 105 by intercepting or receiving the access request. In an embodiment, the access request may be intercepted or received by a WAN accelerator. In another embodiment, the access request may be received by a network device, such as a switch or router, or data storage device, such as a file server, including WAN acceleration or other network traffic optimization functionality.

The request for access may include a request for a lock or other type of access control restriction. Depending upon the type of network file protocol, the application, the type of data, and other factors, such as the application's intended use for the file, the lock or access control restriction requested by the application can restrict write and/or read access to all or a portion of data in the requested file. As discussed in detail below, a lock or access control restriction may restrict write and/or read access to a virtual offset or virtual storage address, which is part of the address space of a file but does not correspond with any physical address or data within the file.

Step 110 attempts to identify the application from the access request. In an embodiment, step 110 attempts to identify the application from the contents and/or attributes of the access request, including the type of access request, the source or network location of the access request, the destination for the access request, and protocol parameters associated with the access request.

In an embodiment, step 110 attempts to identify the application from the contents and/or attributes of the file, file data, or other resource that is the target of the access request, including the file name; file extension; file, resource, or data metadata; file, data, or resource contents; checksums, hashes, digital signatures, or other characteristics derived from file, data, or resource contents; and file, resource, or data structure, such as the resource forks or file streams.

In an embodiment, step 110 attempts to identify the application from the attributes of a lock or access control restriction associated with the access request, including the offset or storage address associated with the lock or access control restriction, the size or amount of data affected by the lock or access control restriction, and the type of lock or access control restriction requested.

In a further embodiment, step 110 may use any combination of the above-described access request contents and/or attributes; file, file data, or other resource contents and/or attributes; and/or attributes of the lock or access control restriction to attempt to identify the application providing the access request.

Step 115 determines if step 110 was successful in identifying the application providing the access request. If step 110 was not successful, then method 100 proceeds to step 130.

Step 130 configures the WAN accelerator or other device including WAN acceleration or other network traffic optimization functionality to optimize network traffic for the requesting application according to a default level of optimization. In an embodiment, the default level of optimization is conservative to prevent any errors in application execution or data corruption. In a further embodiment, the default level of optimization is no optimization of network traffic for the requesting application.

Conversely, if step 110 successfully identifies the application providing the access request, then method 100 proceeds from step 115 to step 120.

Step 120 configures the WAN accelerator or other device including WAN acceleration or other network traffic optimization functionality to optimize network traffic for the requesting application based on known characteristics of the identified application and/or the file, file data, or other resource.

An example of application-specific network traffic optimization configured by step 120 includes more aggressive prefetching and buffering of the data by WAN accelerators. For example, a conservative network traffic optimization may only prefetch and buffer data from the portion of file that is locked; however, if it is known, based on the type of file and the identity of the requesting application, that no part of the file will not be modified in response to a lock on a portion of the file, then the WAN accelerator or other device may be configured to prefetch and buffer any portion or all of the file, improving network performance.

A further embodiment of step 120 can configure WAN accelerators or other devices to prefetch and buffer all or any portion of the data in a requested file or other resource and/or all or any portion of the data in one or more additional files. In an additional embodiment, step 120 can configure WAN accelerators or other devices to compress or optimize the data communicated between WAN accelerators or other device according to characteristics of the requesting application or data. In another embodiment, step 120 can configure WAN accelerators or other devices to perform any other network traffic optimization technique known in the art, such as prediction of further requests by the requesting application. Embodiments of step 120 can configure WAN accelerators or other devices to perform any combination of the above network optimizations.

Following step 120, the application may be granted access to the file or other resource. The application may read and write data to the file or other resource using one or more operations. In an embodiment, the data from the file or other resource, and optionally write data and other operations from the application, is optimized by WAN accelerators or other devices including similar functionality using application-specific network traffic optimization as configured by step 120.

In an further embodiment, method 100 includes optional step 125, in which WAN accelerators or other devices may intercept and monitor further accesses to the file or other resource, such as those from the original requesting application and from any other application. Step 125 evaluates access to the file or other resource and compares these accesses with expected behavior for applications accessing the file. If step 125 determines that any access or access request from the original requesting application or any other application is inconsistent with the expected behavior, step 125 may modify the application accesses to the file or other resource.

For example, as discussed above, if it is known, based on the type of file and the identity of the requesting application, that no part of the file will not be modified in response to a lock on a specific portion of the file, then an example implementation of step 125 may compare accesses and access requests from other application for the file to ensure that this behavior is enforced. If step 125 determines that an application that does not have the lock on the specific portion of the file is attempting to modify a part of the file outside of the locked portion, an embodiment of step 125 can block this access request. In a further embodiment, this example implementation of step 125 may modify the non-conforming access request so that it conforms to the expected application behavior.

In yet another embodiment, if step 125 determines that the original requesting application is not behaving as expected, method 100 may proceed from optional step 125 to step 130 to configure the WAN accelerators or other devices to conservatively optimize network traffic for the application, or to disable network traffic optimization entirely for the application.

In further embodiments, WAN accelerators and other devices with similar functionality may be adapted to optimize network traffic for many applications and files or other resources simultaneously. In these embodiments, the network traffic associated with different access requests and/or applications may be optimized according to different WAN accelerator configurations.

Figure 2A:
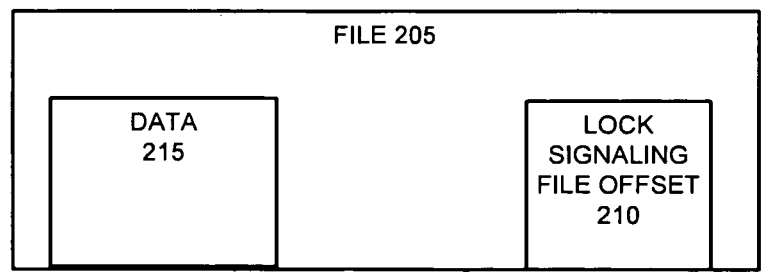
FIGS. 2A and 2B illustrate example protocol-independent locking techniques suitable for use with embodiments of the invention.
Figure 2B:
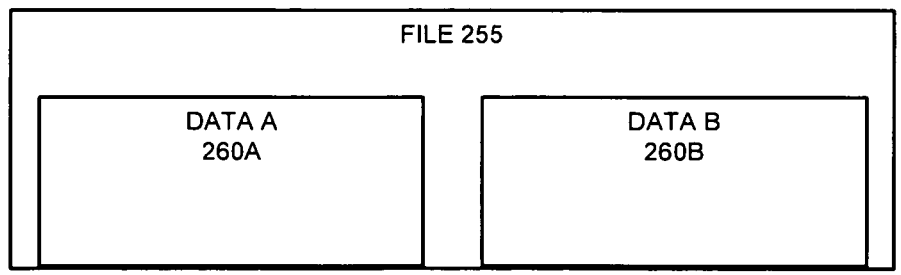
Figure 2B:
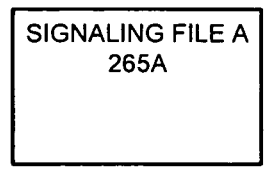
Figure 2B:
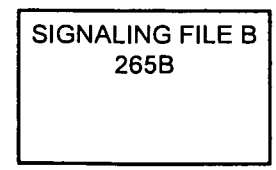

FIGS. 2A and 2B illustrate example protocol-independent locking techniques suitable for use with embodiments of the invention. FIG. 2A illustrates a first protocol-independent locking technique 200 suitable for use with embodiments of the invention. In protocol-independent locking technique 200, an application requests access to a file 205 and a lock at a specific file offset 210. File offset 210 may be at any location within the address space of the file 205, including locations within the physical address space of the file and locations outside of the physical address space of the file but within virtual address space associated with the file. Offset 210 can include any size or quantity of data.

File 205 also includes data 215. In this example protocol-independent locking technique 200, the existence of a lock on offset 210 restricts access to data 215. For example, an application may request a lock for offset 210 prior to attempting to modify data 215. If the lock request is denied, for example because another application has previously locked offset 215, the application will abort its attempt to modify the data 215 until it obtains a lock on offset 210.

In this example, the protocol-independent locking technique 200 relies on applications to behave correctly in response to the lock on offset 215. However, as described above in optional step 125, an embodiment of the invention may modify application accesses to enforce protocol-independent locking techniques. For example, if an application disregards the lock status of offset 210 and attempts to modify data 215, a WAN accelerator or other device can intercept and block this write request, and optionally return a failure code to the application.

FIG. 2B illustrates a second protocol-independent locking technique 250 suitable for use with embodiments of the invention. In protocol-independent locking technique 250, a file 255 includes a plurality of data sets 260, including data set A 260a and data set B 260b. Access to the data sets 260 is controlled by signaling files 265. The existence and/or lock status of the signaling files 265 indicates to applications whether corresponding data sets 260 in file 255 may be modified. Signaling files 265 may optionally include any type of quantity of data, including metadata or indices used to access data sets 260 in file 255.

For example, the existence, contents, and/or lock status of signaling file A 265a indicates if data set A 260a may be modified by applications. For example, if signaling file A 265a is locked by a first application, this may indicate to other applications that this first application is accessing or modifying data set A 260a and that they should not attempt to modify the data set A 260a while signaling file A 265a is locked. Similarly, the contents, existence, or lock status of signaling file 265b indicates to applications whether data set 260b may be modified by applications.

In this example, the protocol-independent locking technique 250 relies on applications to behave correctly in response to the existence, contents, or lock status of signaling files 265. However, as described above in optional step 125, an embodiment of the invention may modify application accesses to enforce protocol-independent locking techniques. For example, if an application disregards a signaling file and attempts to modify a corresponding data set that is being accessed by another application, a WAN accelerator or other device can intercept and block this write request, and optionally return a failure code to the application.

Figure 3:
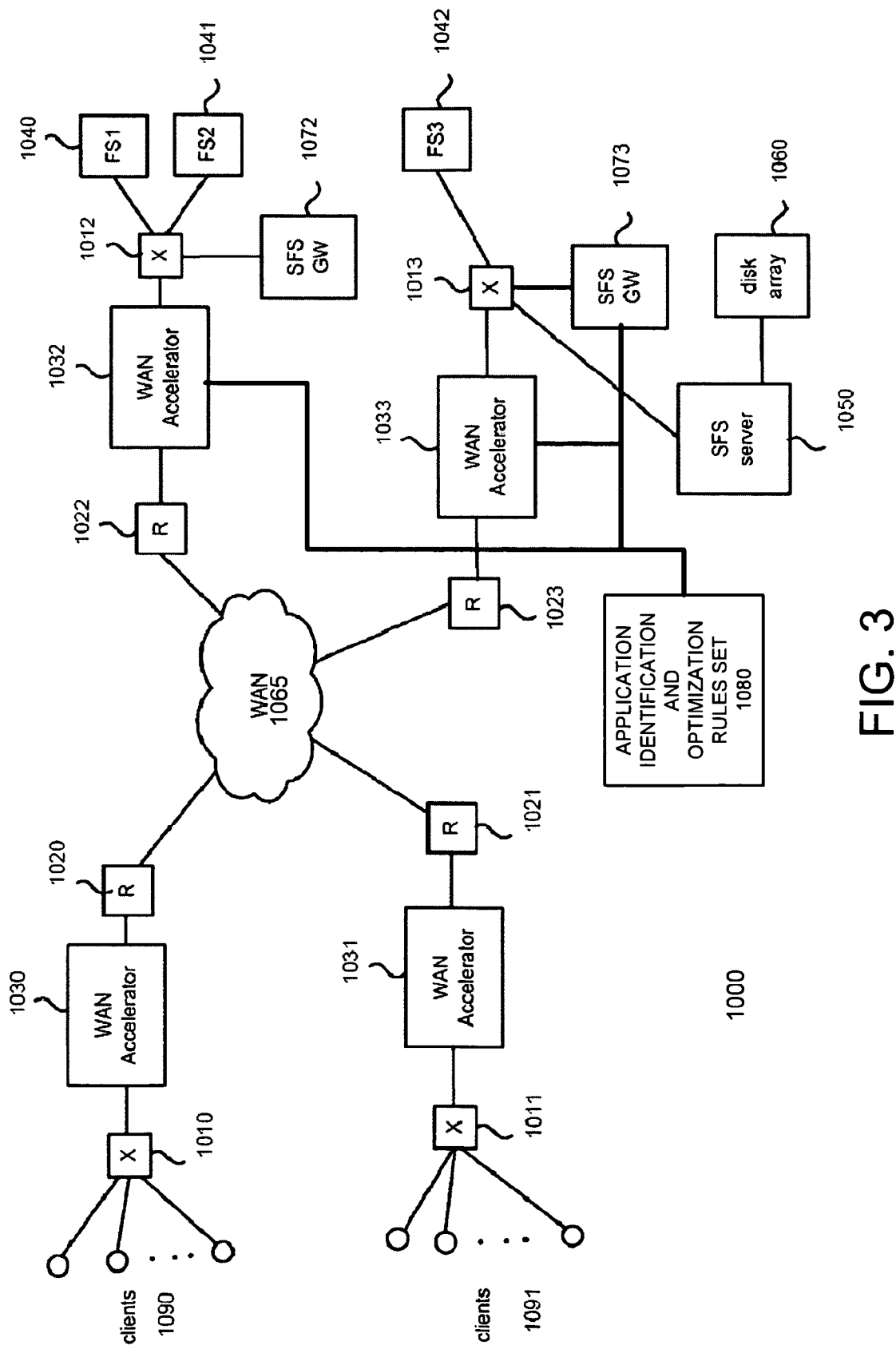
FIG. 3 illustrates an example hybrid WAN acceleration and deduplicating data storage system suitable for use with embodiments of the invention.

FIG. 3 illustrates an example WAN acceleration and/or deduplicating data storage system 1000 suitable for use with embodiments of the invention. FIG. 7 depicts one configuration including WAN accelerators configured at each network site. In this configuration, applications in groups 1090 and 1091 access files ultimately stored on file servers 1040, 1041, and 1042. System 1000 may optionally include optional segment-orientated file server (SFS) gateways and an SFS server. Local area networks 1010, 1011, 1012, and 1013 provide data communications between applications, SFS gateways, SFS servers, file servers, WAN accelerators, wide-area networks, and other devices. Local area networks 1010, 1011, 1012, and 1013 may include switches, hubs, routers, wireless access points, and other local area networking devices. Local area networks are connected via routers 1020, 1021, 1022, and 1023 with a wide-area network (WAN).

The applications may access files and data directly using native file server protocols, like CIFS and NFS, or using data interfaces, such as database protocols. In the case of file server protocols, local or remote applications access file and data by mounting a file system or "file share." Each file system may be a real file system provided by a file server such as file servers 1040, 1041, and 1042, or a virtual file system provided by a SFS gateway or storage front-end, such as SFS gateways 1072 and 1073. Once a file system is mounted via a transport connection, files can be accessed and manipulated over that connection by applications or file system tools invoked by the user. Traditionally, these protocols have performed poorly over the WAN but are accelerated by the WAN accelerators present in the network.

For example, a application in group 1091 might access file server 1040 and WAN accelerators 1030 and 1032 would optimize that file server connection, typically providing "LAN-like" performance over the WAN using techniques as those described in U.S. Pat. No. 7,120,666 entitled "Transaction Accelerator for Application Server Communication Systems"; U.S. Pat. No. 6,667,700 entitled "Content-Based Segmentation Scheme for Data Compression in Storage and Transmission Including Hierarchical Segment Representation"; and U.S. Patent Publication 2004/0215746, published Oct. 28, 2004 entitled "Transparent Application-Server Transaction Accelerator", which are incorporated by reference herein for all purposes.

If a application, for example, from group 1091, mounts one of the exported file systems located on SFS gateway 1073 via a transport connection including WAN 1065, WAN accelerators 1031 and 1033 will optimize network traffic for passage through WAN 1065. In an embodiment, each of the WAN accelerators 1031 and 1033 will partition network traffic into data segments, similar to those described above. WAN accelerators 1031 and 1033 will buffer frequently used data segments.

For example, when one of the applications 1090 requests a file, WAN accelerator 1032 reads the requested file from a file system and partitions the file into data segments. WAN accelerator 1032 determines the data layout or set of data segments comprising the requested file. WAN accelerator 1032 communicates the data layout of the requested file to WAN accelerator 1030, which in turn attempts to reconstruct the file using the data layout provided by WAN accelerator 1032 and its cached data segments. Any data segments required by a data layout and not cached by WAN accelerator 1030 may be communicated via WAN 165 to WAN accelerator 1030.

Optionally, further benefits are achieved, however, by arranging for applications to access the files stored on file servers 1040, 1041 and 1042 via the SFS gateways 1072 and 1073 or SFS server 1050. In this scenario, SFS gateways 1072 and 1073 export one or more virtual file systems. The SFS gateways 1072 and 1073 may implement data deduplicated storage using the file servers 1040 and/or 1041 to store data segments, data layouts, and file or other metadata.

To improve performance, an optional implementation of system 1000 allows WAN accelerators to access data segments and data layouts directly in deduplicating data storage using a SFS protocol. In this implementation, when one of the applications 1090 requests a file, WAN accelerator 1032 accesses a SFS gateway, such as SFS gateways 1072 and 1073, or a SFS server, such as SFS server 1050, to retrieve the data layout of the requested file directly. WAN accelerator 1032 then communicates this data layout to WAN accelerator 1030 to reconstruct the requested file from its cached data segments. The advantage to this approach is that WAN accelerator 1030 does not have to read the entire requested file and partition it into data segments; instead, the WAN accelerators leverage the segmentation and data layout determinations already employed by the data deduplicating storage.

The benefits of the SFS architecture can accrue to an optional SFS file server as depicted in FIG. 7, whereby SFS server 1050 is interconnected to disk array 1060. The optional SFS server acts as a combination of a SFS gateway and an associated file server or data storage system. In this scenario, there is no need for backend file servers, because the SFS server 1050 implements or interfaces with its own data storage system. The SFS server 1050 may include an external disk array as depicted, such as a storage area network, and/or include internal disk-based storage.

As discussed above, embodiments of WAN accelerators and other devices including similar functionality, such as SFS gateways and SFS server, attempt to identify applications and file types being accessed by detecting application-specific access behavior. In an embodiment, at least one application identification and optimization rule set 1080 is associated with one or more WAN accelerators or other devices. The rule set 1080 provides WAN accelerators and other devices with criteria specifying application-specific access behaviors and associated WAN accelerator optimizations. The rule set may specify criteria in the form of parameters for predefined functions or in any other form known in the art, such as rules, conditional statements, or scripts. The rule set 1080 may be updated at any time to meet the requirements of system 1000 and its applications.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of accelerating data access over a wide-area network, the method comprising:
   receiving a data access request from an application for access to a data resource;
   analyzing the data access request to identify application-specific behavior indicating a type of data access for the data resource, wherein the data access request includes an attribute of an access control restriction inhibiting at least a second application from at least partially accessing at least a portion of the data resource;
   selecting a network traffic optimization based at least on the attribute of the access control restriction for the data resource; and
   configuring WAN acceleration functionality of a first device based on the type of data access for the data resource.

2. The method of claim 1, wherein analyzing the type of data access comprises:
   evaluating an attribute of the data access request.

3. The method of claim 2, wherein the attribute of the data access request is selected from a group consisting of:
   a type of access request, a source network location of the access request, a destination network location of the access request, and protocol parameters associated with the data access request.

4. The method of claim 1, wherein analyzing the type of data access comprises:
   evaluating an attribute of the data resource.

5. The method of claim 4, wherein the attribute of the data resource is selected from a group consisting of:
   contents of the data resource, a name of the data resource, a location of the data resource, an extension associated with the data resource, metadata associated with the data resource, a characteristic derived from the data resource, and a structure of the data resource.

6. The method of claim 1, wherein the attribute of the access control restriction is selected from a group consisting of:
   a type of access control restriction, a protocol associated with the access control restriction, a data resource offset or address associated with the access control restriction, and a size or range associated with the access control restriction.

7. The method of claim 1, wherein receiving the data access request from the application for access to the data resource comprises:
   intercepting the data access request on route to a server.

8. The method of claim 1, wherein the network traffic optimization is adapted to prefetch and buffer a first portion of the data resource.

9. The method of claim 8, wherein the first portion of the data resource is different than a second portion of the data resource associated with the data access request.

10. The method of claim 9, wherein the second portion of the data resource is associated with an access control restriction and the first portion of the data resource is not associated with the access control restriction.

11. The method of claim 1 wherein the network traffic optimization is adapted to prefetch and buffer a first portion of a second data resource separate from the data resource associated with the data access request.

12. The method of claim 1, wherein the data access request is received by the first device.

13. The method of claim 1, wherein the data access request is received by a second device, wherein configuring WAN acceleration functionality of the first device comprises:
   communicating the network traffic optimization from the second device to the first device.

14. The method of claim 1, comprising:
   receiving a second data access request for access to the data resource;
   determining if the second data access request is consistent with the application-specific behavior; and
   modifying the second data access request in response to the determination that the second data access request is inconsistent with the application-specific behavior.

15. The method of claim 14, wherein the second data access request is received from a second application.

16. The method of claim 14, wherein the second data access request is received from the application.

17. The method of claim 14, comprising:
- selecting a default network traffic optimization in response to the determination that the second data access request is inconsistent with the application-specific behavior; and
- configuring the WAN acceleration functionality of the first device to the default network traffic optimization.

18. The method of claim 1, wherein analyzing the data access request to identify application-specific behavior indicating a type of data access for the data resource comprises:
- comparing the data access request with at least one criteria from an application identification and optimization rule set.

19. The method of claim 16, wherein the application identification and optimization rule set includes function parameters.

20. The method of claim 1, wherein the data resource is includes a file.

21. The method of claim 1, wherein the data resource is includes file data.

* * * * *